Sept. 29, 1936.　　　C. H. KESTENMAN　　　2,055,541
BRACELET CHAIN OR LINKAGE
Filed June 9, 1936
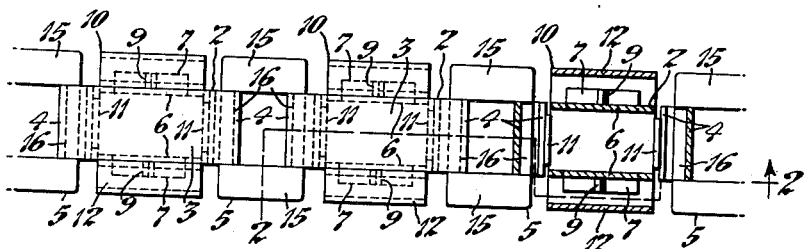
Fig. 1.
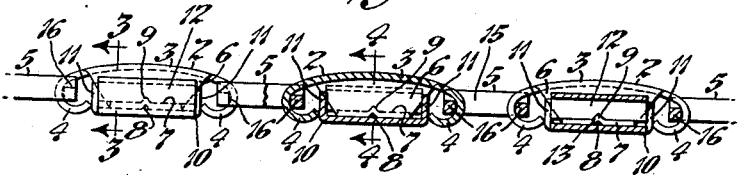
Fig. 2.
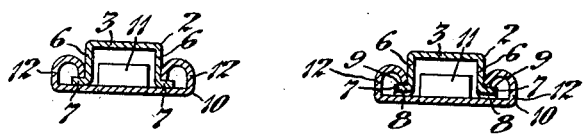　　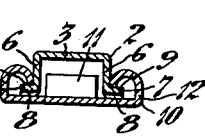
Fig. 3.　　　　Fig. 4.
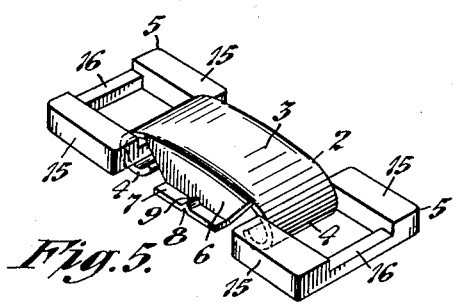　　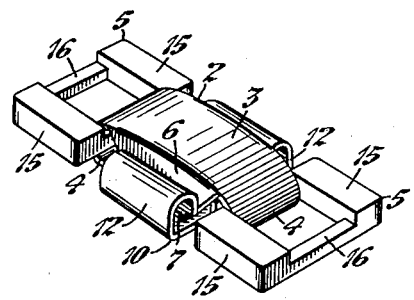
Fig. 5.　　　　　　　　Fig. 7.
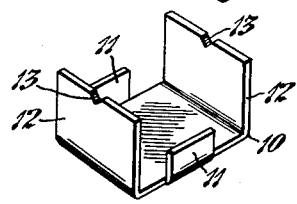
Fig. 6.
Inventor:
Charles H. Kestenman
By
Attorneys.

Patented Sept. 29, 1936

2,055,541

UNITED STATES PATENT OFFICE 2,055,541

BRACELET CHAIN OR LINKAGE

Charles H. Kestenman, Providence, R. I., assignor to Kestenman Bros. Mfg. Co., Providence, R. I., a corporation of Rhode Island Application June 9, 1936, Serial No. 84,315

6 Claims. (Cl. 59—80)

This invention relates to jewelry chains or linkages and particularly to improvements in the structure of box-type links employed in watch-bracelets and for other purposes.

One object of the invention is to provide a hollow link of the type indicated comprised of separate parts permanently joined together without the use of pins, rivets, screws, solder or the like.

Another object of the invention is to provide an improved structure of box-link having its parts constructed of sheet-metal stampings adapted to be assembled by forming operations which may be accomplished in a press.

Another object of the invention is to provide an improved box-link structure which is light in weight to save stock, of symmetrical shape and highly ornamental in appearance.

Further objects of the improvement are set forth in the following specification which describes, by way of example, a preferred form of construction of a linkage including the improved box-link illustrated by the accompanying drawing. In the drawing:

Fig. 1 is a plan view of a linkage embodying a series of the present improved box-links joined by looped connecting links to form a chain or bracelet;

Fig. 2 is a side elevation of the same showing certain of the links in part section on line 2—2 of Fig. 1 to illustrate the constructional features thereof;

Fig. 3 is a transverse sectional view of the improved box-link taken on line 3—3 of Fig. 2;

Fig. 4 is a similar view taken on line 4—4 of Fig. 2;

Fig. 5 is a perspective view illustrating the main element of one of the box-links with looped links connected to its ends;

Fig. 6 is a perspective view of the bottom member or element of the box-link shown as blanked out and formed ready to be applied to the upper or main element; and Fig. 7 is a view similar to Fig. 5 showing the two members of the box-link in assembled relationship with a pair of connecting links joined thereto.

It is desirable in the jewelry art that the links of chains and bracelets be designed to give the appearance of weight and solidarity, while at the same time being of light construction to save stock, especially when the links are made of precious metals. For this reason prevailing styles of bracelets and chains are constructed, at least in part, from hollow links and the present invention provides a box-type link having the desired attributes while being capable of manufacture and assembly in tools without requiring hand work. To this end the present box-link structure comprises only two elements or members constructed as sheet-metal stampings and adapted to be assembled in permanently connected relationship by the use of suitable dies in a drop press. In general, the improved link comprises an upper member having a crowned top with loops at its end for joinder to intermediate connecting links, and a bottom or base member adapted to enclose the open under side of the upper member and formed with portions curled over to embrace the sides thereof and attach the base member thereto.

Referring to the drawing, the improved box-link is preferably constructed of sheet-metal parts blanked out and formed to provide an upper member 2 having an arched or crowned top plate 3, the projecting ends of which are curled around in under the top plate to form loops 4 for joinder to the crossbars of suitable connecting links 5. Projecting from the sides of the top plate 3 integral therewith are triangularly-shaped wings or side extensions 6 bent downwardly at substantially right angles to the main portion of the member 2 and then folded outwardly to provide relatively narrow lateral flanges or ledges 7. The ledges or flanges 7 are preferably crimped at their central portions by indenting the metal at 8 on the under side of the flanges to force up triangular lugs or ridges 9 on their upper faces; these raised projections or lugs providing detents for a purpose as later explained.

Referring particularly to Fig. 6, the lower or base member 10 of the link is blanked from sheet-metal in rectangular outline with relatively narrow projecting portions or tabs 11 extending from its lateral edges centrally of the blank. These tabs 11 are bent upwardly at right angles to the main strip and the ends of the blank itself are also bent upwardly at right angles to form side plates 12. The edges of the side plates 12 are notched with triangular indentations 13 conforming to the triangular lugs or detents 9 on the side flanges or ledges 7 of the upper member 3 of the link. Each of the links may be blanked out and shaped in a single set of tools or dies and the method of assembling the parts, which may be accomplished in other dies, is as next explained.

The design or shape of the upper member 3, particularly as regards the triangular shape of its side wings 6 provide that the connecting links 5 may be assembled therewith after the upper member has been completely formed in the dies. If preferred, however, the curled-under ends or loops 4 of the upper member 3 may be left partly extended or incompletely bent so that the box-links may be completed and thereafter assembled with the connecting links 5 by bending the loops around the end bars thereof. As herein shown the connecting links 5 are of rectangular loop-shape having relatively flat longitudinal bars 15 connected at their ends by narrower crossbars 16.

With the preferred method of assembling the chain or linkage before completion of the box-links, the crossbars 16 of the connecting links 5 are hooked into the loops 4 as shown in Fig. 5; the inclined edges of the side plates 6 of the upper member 2 providing clearance for this purpose. The bottom member 10 may then be assembled with the upper member 2 by placing it thereabeneath located in position with the tabs 11 projecting upwardly into the open bottom of the upper member and abutting the ends of the loops 4 to serve as a closure therefor to prevent disconnection of the connecting links 5 therefrom. In this relationship of the parts the side plates 12 of the bottom member 10 are rolled or curled over against the face of the side plates 6 of the upper member 2, as shown in Fig. 3, with their edges brought down into abutting relationship with the top of the side flanges or ledges 7. As the edges of the side plates 12 are thus brought into joinder with the flanges or ledges 7 the detent lugs 9 will engage in the triangular notches 13 to restrain the two parts of the link from relative longitudinal displacement. While this arrangement of the detent-means to lock the parts together is not essential to the construction of the present improved box-link it is of advantage in that the parts will not become dislocated should it become necessary to bend back the end loops 4 of the link to uncouple it from its adjacent connecting links 5. This procedure frequently becomes necessary, that is the removal of one or more links from or their addition to, a watch-bracelet to adjust its length to fit the wrist of the wearer. On the other hand, the tabs 11 on the base member 10 normally engage across the open ends of the loops 4 to hold the two parts of the link from relative longitudinal movement so that the detent-lugs 9 are only necessary as a precautionary measure when the links are designed to be attachable to, or detachable from, other links in a chain or bracelet.

It will be observed from the foregoing that the present invention provides a particularly ingenious and simple construction of box-link of the type indicated which is economical to manufacture while providing further economies in the saving of stock. The improved link may be manufactured from sheet-metal parts blanked out and struck up in dies at a single operation and its two members may be assembled in other forming dies, thus eliminating hand work and rendering the manufacturing operation more rapid and economical.

In its completed form the link has the appearance of solidarity as comprising a closed arched top, a closed bottom, and completely closed sides due to the cooperation of the plates 12 of the base member 10 with the side plates 6 of the upper member 3. As will be observed by reference to the showing at the left of Fig. 2 the link is thus completely closed on all sides and the rolled-over side plates 12 conform to the general shape of the longitudinal side bars 15 of the connecting links 5 to give a symmetrical and ornamental appearance to the complete assembly, see Figs. 1 and 7.

While the invention is herein shown as embodied in a preferred form of construction, it is to be noted that various modifications may be made in the structure and shape of the parts of the link without departing from the spirit or scope of the invention. Therefore, without limiting myself in this respect, I claim:

1. A hollow link for bracelets and chains comprising an upper member of sheet-metal formed with connecting loops at its ends and side wings depending from its top with ledges projecting laterally therefrom, and a base member of sheet-metal having a bottom strip extending across the under side of the upper member, the extended ends of the bottom strip being curled over against the sides of the upper member with their edges abutting the ledges thereon to hold the parts in connected relationship.

2. A hollow link for bracelets and chains comprising an upper member having a top plate with its ends rolled under to form loops for connection with other links of a series, projecting portions of the top plate being bent downwardly to form sides with ledges projecting laterally from the bottom thereof, and a base member having a bottom portion underlying the lateral flanges on the sides of the upper member, the ends of said bottom portion being bent upwardly and curled around to engage against the sides of the upper member with their edges abutting the upper faces of the lateral flanges.

3. In a box-type link for bracelets, chains and the like, the combination of an upper member formed of sheet-metal with a top-plate having loops at its ends for connection with other links of a series, said top plate having extensions bent downwardly to form sides with ledges at the bottom thereof, and a base member having a bottom portion abutting the lower ends of the sides of the upper member with portions thereof bent upwardly and curled over to abut the sides of the upper member with their edges engaging the ledges thereof, said base member having tabs bent upwardly from its bottom portion and extending across the open ends of the loops on the upper member.

4. In a bracelet or chain link of the type indicated, the combination of an upper member formed of sheet-metal with a top plate having loops at its ends for connection with other links of a series, said top plate having extensions bent downwardly from its sides and formed with ledges at the bottom thereof, and a base member having a bottom portion abutting the lower ends of the sides of the upper member with extensions thereof bent upwardly and curled around to abut the sides of the upper member with their edges in abutting relationship with the ledges thereon, said ledges and extensions of the base member having interengaging detent-means to retain the parts against relative longitudinal movement one on the other.

5. In a bracelet or chain link of the type indicated, the combination of an upper member having a top plate with its ends bent into loops for connection with other links of a series, said top plate having extensions bent downwardly from its sides and formed with ledges at the bottom thereof having detent-lugs projecting therefrom, and a base member having a bottom plate bridging the space between the sides of the upper member and having extensions bent upwardly and curled around to abut the sides of the upper member, the edges of said extensions abutting the ledges on the sides of the upper member and being provided with notches interengaging with the lugs thereof to hold the parts in assembled relationship.

6. In a bracelet or chain link of the type indicated, the combination of an upper member having an arched top plate extending longitudinally thereof and rolled under at its ends to form loops for connection with other links of a series, said top plate formed with lateral extensions bent downwardly to form side wings with ledges at the bottom thereof, and a base member provided with a bottom portion bridging the space between the side wings of the upper member and formed with extensions bent upwardly and curled over to abut the sides of the upper member with their ends in abutting relationship with the ledges thereon.

CHARLES H. KESTENMAN.